April 11, 1950     R. J. NEBESAR     2,503,450
AIRFOIL
Filed March 5, 1945     2 Sheets-Sheet 1
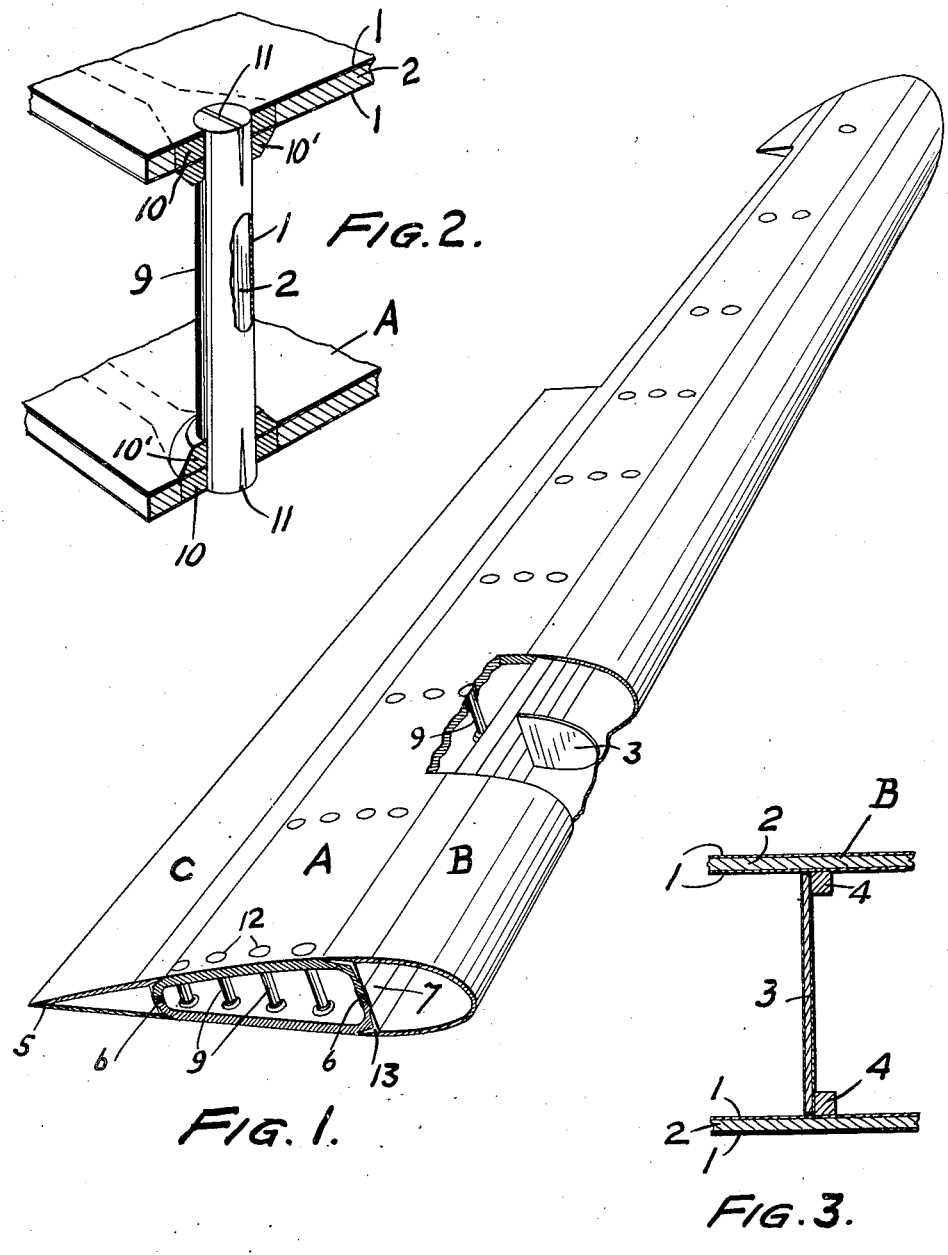
INVENTOR
Robert J. Nebesar April 11, 1950          R. J. NEBESAR          2,503,450

AIRFOIL

Filed March 5, 1945          2 Sheets-Sheet 2

WITNESS:

INVENTOR
Robert J. Nebesar
BY
ATTORNEYS.

Patented Apr. 11, 1950

2,503,450

UNITED STATES PATENT OFFICE 2,503,450

AIRFOIL

Robert J. Nebesar, Bristol, Va., assignor to Universal Moulded Products Corporation, Bristol, Va., a corporation of Delaware Application March 5, 1945, Serial No. 581,058

1 Claim. (Cl. 244—123)

This invention relates to an airfoil structure and, more particularly, to an airfoil structure in which a novel form and arrangement of internal bracing is provided.

As will be obvious, structures in accordance with this invention will be adaptable for the provision of various forms of airfoil as, for example, wings, wing sections, rudders, stabilizers, ailerons, and the like.

More particularly, the structure according to this invention will comprise skin sections of the so-called sandwich type, comprising a high density surface skin and a low density core, and interiorly braced by means of a plurality of spaced posts bonded to the upper and lower skin sections of a given airfoil as to transmit the loads therebetween.

Having now indicated, in a general way, the nature and purpose of this invention, I will proceed to a detailed description thereof with reference to the accompanying drawings in which an embodiment is illustrated and in which:

Figure 1 is a perspective view of a wing, partly in section and partly broken away to show details of construction.

Figure 2 is a partial sectional view of the wing shown in Figure 1, partly broken away.

Figure 3 is a sectional view showing a detail of construction of a section of the wing shown in Figure 1.

Figure 4:
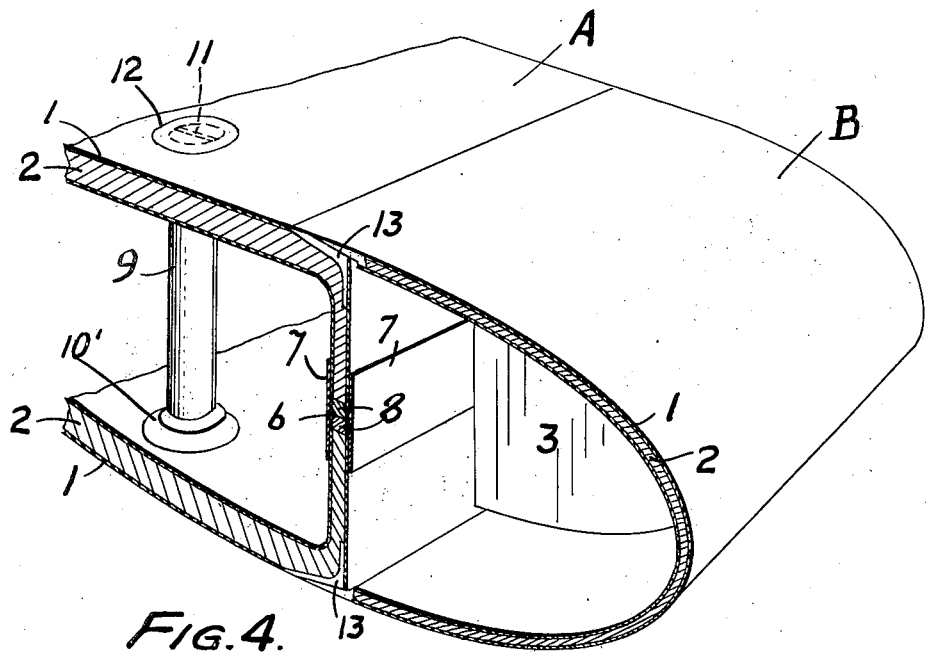
Figure 4 is a sectional view of the leading edge portion of the wing shown in Figure 1.
Figure 5:
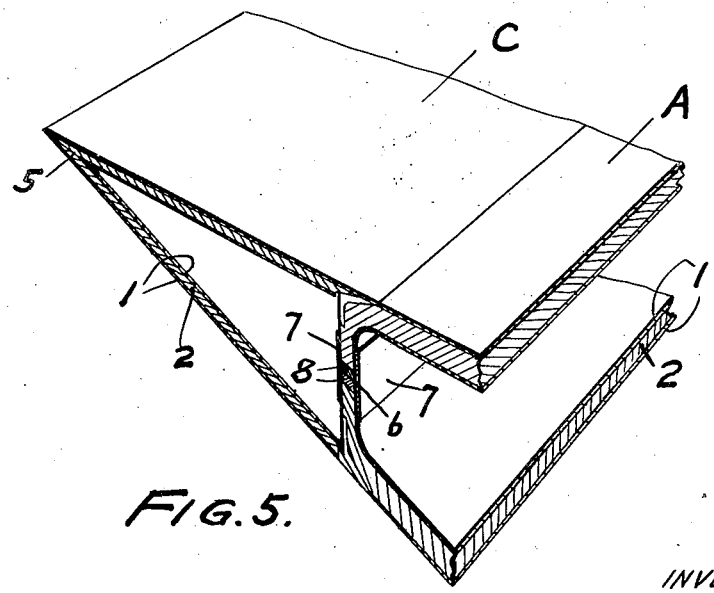
Figure 5 is a sectional view showing the trailing edge portion of the wing shown in Figure 1.

In the several figures A indicates the center section, B the leading edge section and C the trailing edge section of a wing.

The skins of the several sections are formed of a sandwich structure comprising a relatively thin, high density surfacing elements 1, composed, for example, of resin impregnated paper, fibre glass, sheet metal, wood veneer, or the like, and a low density core 2, composed of a low density, light weight material, as, for example, balsa wood, cellulose, cellulose acetate, hardened sponge rubber, or the like. The sandwich material may be made up in any usual manner, the high density skin surfacing elements 1 being adhered, as with an adhesive, as a glue, a synthetic resin, or the like, to the low density core 2.

The leading edge section B may be molded in a single unit, the reinforcing webs 3, which may be of sandwich material, being bonded to capstrips 4, 4 bonded within the skin. The trailing edge section C may be formed in two halves bonded at the trailing edge on a scarfed joint 5. The leading edge section B and the trailing edge section C will be bonded to the center section A, as will be described.

The skins of the center section A will be formed in two halves, upper and lower, which will be bonded together at the joints 6, 6 at the centerline and spliced by means of strips 7, 7 bonded to the web on opposite sides of the joints. As shown at 8, 8, Figure 4, the areas of the core of the sandwich material adjacent to the joints 6, 6 will be of higher density material than that of the core as a whole in order to give strength to the joints. Spars 13, 13 are bonded to the center section at its front and rear.

Extending through apertures in the upper and lower skins of the center section A and acting as internal braces are a series of spacing posts 9, 9 comprising a core of low density material 2 and surfacing elements of high density material 1.

The posts 9, 9 extend through holes bored in the skins of the section A from the outside and the area about the holes may be reinforced by inserts 10 of high density material in the core 2 between the surfacing elements 1 and reinforcements 10' of high density material may be secured to the inner surfacing elements of the upper and lower skins about the holes for the posts 9, 9.

The ends of the posts are provided with slots for the reception of wedges 11, 11 whereby, when the posts are inserted into the surfaces, their end portions may be expanded to secure them to the surfaces, a bonding material being used to bond the end portions of the posts to the surfaces and to the reinforcements 10'.

When the posts are in place and bonded, their ends are trimmed to conform to the outer surfacing elements of the upper and lower skins and they are covered with patches 12, 12 bonded to the surfacing elements.

The posts 9, 9 are located to break up the section A into small panels and to provide requisite internal bracing.

As will now be observed, the posts 9, 9 are secured to the upper and lower skins by bonding, through which the loads between the upper and lower skins are transmitted to the posts.

The leading edge section B and the trailing edge section C are assembled to the center section A and bonded to the spars 13, 13.

It will now be appreciated that various modifications in details of construction and in materials as described above may be made without departing from this invention, and it will be understood that it is contemplated that this invention as defined by the appended claim is adaptable to the construction of airfoils generally.

What I claim and desire to protect by Letters Patent is:

An airfoil structure having upper and lower skins, each skin having a low density core and high density spaced reinforcing inserts, high density surfacing elements secured to the opposite surfaces of the core and the inserts, high density reinforcements secured to the inner surfacing elements of each skin, and bracing members extending from skin to skin through a reinforcement, a reinforcement insert and the surfacing elements of both skins, said bracing members being secured to the reinforcements, the inserts and surfacing elements of both skins.

ROBERT J. NEBESAR.

REFERENCES CITED

The following references are of record in the file of this patent:

UNITED STATES PATENTS

| Number | Name | Date |
| --- | --- | --- |
| 70,151 | Baird | Oct. 29, 1867 |
| 1,507,143 | Toussaint et al. | Sept. 2, 1924 |
| 1,728,806 | Schad | Sept. 17, 1929 |
| 1,822,940 | Sundstedt | Sept. 15, 1931 |
| 1,874,685 | Wright | Aug. 30, 1932 |
| 1,988,085 | Orlando | Jan. 15, 1935 |